Dec. 29, 1953     A. H. ERIKSSON     2,664,059
SPOOL BOX FOR SEWING MACHINES
Filed April 3, 1950
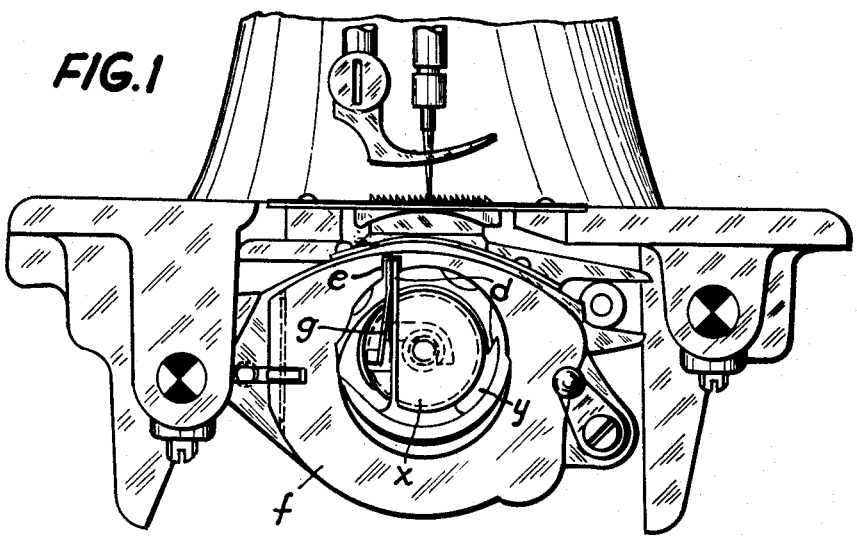
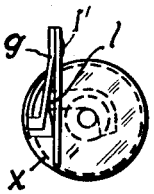
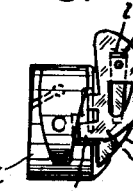
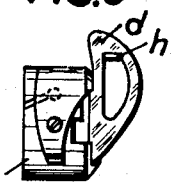
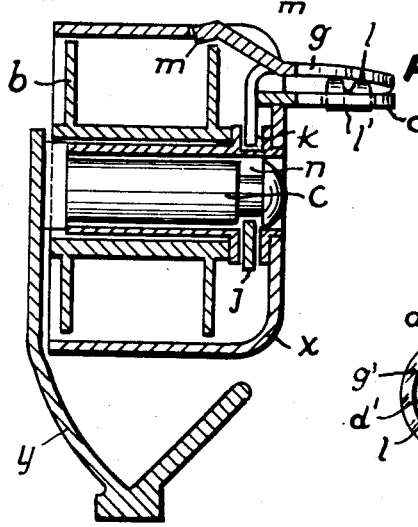
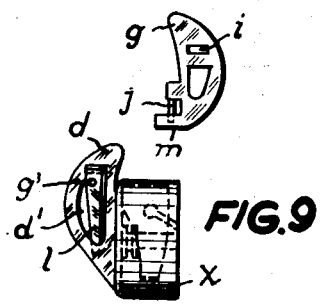
INVENTOR
ALLAN H. ERIKSSON
BY *Young, Emery & Thompson*
ATTORNEYS Patented Dec. 29, 1953

2,664,059

UNITED STATES PATENT OFFICE 2,664,059

SPOOL BOX FOR SEWING MACHINES

Allan Herman Eriksson, Huskvarna, Sweden, assignor to Husqvarna Vapenfabriks Aktiebolag, Huskvarna, Sweden, a corporation of Sweden Application April 3, 1950, Serial No. 153,579

Claims priority, application Sweden April 7, 1949

3 Claims. (Cl. 112—231)

The present invention refers to spool boxes or bobbin-cases for sewing machines and has for its object to provide a suitable structure of that device which is grasped by the fingers of the operator, when the spool box with the spool for the lower thread of the machine contained therein is to be inserted into or removed from its place within the shuttle. One object of the invention is to provide means facilitating the insertion and the removal of the spool box, and a further object is to simplify the construction of the parts serving to retain the spool box in the machine and the spool in the box.

An embodiment of the invention will be described hereinafter, reference being had to the accompanying drawing, in which Fig. 1 is a vertical elevation, illustrating the lower portion of that end of the sewing machine where the seam is being formed. Fig. 2 is an elevation, illustrating the spool box viewed from the same direction as in Fig. 1. Fig. 3 is a side elevation of the spool box. Fig. 4 is a rear elevation of the spool box, i. e. a view from the opposite end relatively to Fig. 2. Fig. 5 is a side elevation like Fig. 3 but illustrating the spool box as mounted only with its thread tensioning spring. Fig. 6 is an elevation illustrating the detail, by means of which the spool box is retained in the machine, said detail being viewed from the side of the machine. Fig. 7 is an elevation illustrating the same member as Fig. 6 but viewed from within the machine, and Fig. 8 is an axial sectional view on an enlarged scale, illustrating the spool, the spool box, and that part of the machine (the shuttle) on which the spool box is mounted. Fig. 9 is an elevation like Fig. 3 but showing the spool box from the opposite side.

The spool box $x$ (see Figs. 1, 2, 3, 4, 5 and 6) is a cup-shaped member having a hollow bearing pin $a$, which carries the spool $b$ mounted thereon (see Fig. 8). The spool box $x$ is thrust inwardly onto the pin $c$ of the shuttle $y$ (see Fig. 8), when the box is inserted in its place within the shuttle. The spool box is prevented from turning by the provision of a tongue $d$ on the spool box, which tongue projects into a groove $e$ in the shuttle bearing means, preferably the shuttle cover $f$. The tongue $d$ projects at an angle from the head wall of the spool box, preferably at right angles to said wall, so as to be readily accessible. The tongue may be integral with said wall or be secured thereto by for example soldering or welding.

The projecting tongue $d$ has a lateral projection $h$ forming a pivot means for a coupling member $g$ by engaging a slot $i$ in the member $g$. Member $g$ is retained on tongue $d$ by a spring such as a bent leaf spring $l$ which is secured to member $g$ by a screw $g'$ opposite an aperture $d'$ in tongue $d$, said spring having a bent end portion gripping over an edge of said aperture $d'$.

The member $g$ takes a position such as to become actuated by the fingers of the operator at the gripping of the tongue $d$, so that it will be moved into a position in which the spool box can be removed from the pin $c$. This is so because the member $g$ is provided with an arm $j$, which in the position of insertion of the box engages a circumferentially extending groove $n$ in the pin $c$ on which the box is mounted in the shuttle, as well as with a finger $m$ or the like which, at the insertion and removal of the box, is moved into a position retaining the spool in the spool box. The arm $j$ also engages into a groove and slot $k$ in the bearing pin $a$ of the box, said slot enabling the arm to engage the groove $n$ through the wall of the pin $a$. As will be seen from Fig. 8, the finger $m$ is intended to cooperate by its curved end with the one flange of the spool $b$ so as to retain the same.

The leaf spring $l$ is not only adapted to retain the member $g$ at the tongue $d$ but also pushes the same from the tongue $d$ at the end portion provided with the finger $m$. By the fact that the member $g$ is pushed by the spring from the tongue $d$, the arm $j$ will be kept in engagement with the groove $n$ in the pin $c$ of the shuttle in the manner set forth.

At the removal of the spool box from the shuttle, the tongue $d$ and the member $g$ are gripped at the same time by the fingers, so that said parts are pressed against each other against the action of the spring $l$. In this procedure, the arm $j$ slides out of the groove $n$ in the pin $c$ of the shuttle. The finger $m$ of the member $g$ is caused at the same time to bear against one of the flanges of the spool, so that the latter will be retained in the box when removed. The same conditions prevail at the insertion of the box into the shuttle.

What I claim is:

1. In a sewing machine, the combination with a shuttle having a grooved pin mounted thereon, of a spool box adapted to be mounted on the pin and having a tongue mounted thereon for facilitating insertion and removal of the spool box from the shuttle, said tongue being directed at substantially right angles to a head wall of the spool box, and a coupling member pivotally mounted on the tongue to be movable toward and away from the tongue and having an arm extending into the box and cooperating with the groove in the pin for coupling the spool box to the shuttle, said coupling member being mounted movably on at its pivot at one side of the tongue so as to be engaged by the fingers of the operator at the same time as the tongue is grasped for the insertion and removal of the spool box from the shuttle.

2. In a sewing machine, the combination with a shuttle having a pin with a groove, of a spool box adapted to be mounted on the pin and comprising a tongue mounted on the box for facilitating the insertion of the spool box in the shuttle and the removal of said box from the shuttle, said tongue being directed at substantially right angles from the spool box, a coupling member pivotally mounted on the tongue to be movable toward and away from the tongue and formed with an arm extending into the box for engagement with the groove of said pin to retain the spool box in the shuttle in a coupling position, and a spring mounted to actuate the coupling member to retain it in said coupling position, said coupling member being mounted swingably on its pivot at one side of the tongue, whereby the coupling member is grasped by the operator simultaneously with the tongue at the insertion and removal of the spool box.

3. The combination claimed in claim 2, in which the coupling member is further provided with a finger extending into the box and adapted to be moved to a position for contacting and retaining the spool in the spool box during the insertion and removal operation.

ALLAN HERMAN ERIKSSON.

References Cited in the file of this patent

UNITED STATES PATENTS

| Number | Name | Date |
| --- | --- | --- |
| 2,420,536 | Hohmann | May 13, 1947 |
| 2,420,695 | Best | May 20, 1947 |

FOREIGN PATENTS

| Number | Country | Date |
| --- | --- | --- |
| 135,786 | Great Britain | Dec. 4, 1919 |